United States Patent
Mähönen et al.

(10) Patent No.: US 8,073,432 B2
(45) Date of Patent: Dec. 6, 2011

(54) DATA SYNCHRONIZATION

(75) Inventors: Hannu Mähönen, Tampere (FI); Marko Törmä, Nokia (FI); Riku Mettälä, Tampere (FI); Teemu Toroi, Helsinki (FI)

(73) Assignee: Nokia Corporation, Espoo (FI)

( * ) Notice: Subject to any disclaimer, the term of this patent is extended or adjusted under 35 U.S.C. 154(b) by 1026 days.

(21) Appl. No.: 10/695,521

(22) Filed: Oct. 28, 2003

(65) Prior Publication Data

US 2004/0136404 A1 Jul. 15, 2004

(30) Foreign Application Priority Data

Oct. 29, 2002 (FI) .................................... 20021920

(51) Int. Cl.
*H04M 3/42* (2006.01)
(52) U.S. Cl. ................... 455/414.1; 455/550.1; 709/248
(58) Field of Classification Search ............... 455/414.1, 455/550.1; 709/248
See application file for complete search history.

(56) References Cited

U.S. PATENT DOCUMENTS

| | | | |
|---|---|---|---|
| 5,701,423 A | | 12/1997 | Crozier |
| 6,247,135 B1 * | | 6/2001 | Feague .................... 713/400 |
| 2001/0005364 A1 | | 6/2001 | Kang |
| 2001/0041592 A1 * | | 11/2001 | Suonpera et al. ............ 455/557 |
| 2003/0023759 A1 * | | 1/2003 | Littleton et al. ............. 709/248 |
| 2003/0069874 A1 * | | 4/2003 | Hertzog et al. ................ 707/1 |
| 2003/0220966 A1 * | | 11/2003 | Hepper et al. ................ 709/203 |

FOREIGN PATENT DOCUMENTS

| | | |
|---|---|---|
| EP | 1 267 283 A2 | 12/2002 |
| WO | WO 02/077860 A1 | 10/2002 |
| WO | WO 03/079145 A2 | 9/2003 |

OTHER PUBLICATIONS

Bluetooth SIG, Feb. 22, 2001, Bluetooth Specification Version 1.1, Object Push Profile.*
Feb. 15, 2002, SyncML, "SyncML Device Management Protocol", Version 1.1.
Jun. 15, 2001, "SyncML Device Information DTD".
Feb. 15, 2001, "SyncML Sync Protocol v.1.1".

* cited by examiner

*Primary Examiner* — Steven Lim
(74) *Attorney, Agent, or Firm* — Hollingsworth & Funk, LLC

(57) ABSTRACT

The invention relates to a method and an apparatus for arranging data synchronization is a synchronization system which comprises at least a first synchronization device and a second synchronization device. The synchronization system defines binding data which associates a user data unit of the first synchronization device with at least one function of the first synchronization device. A first synchronization step is performed between the first synchronization device and the second synchronization device, the step comprising transferring the user data unit from the first synchronization device to the second synchronization device. After the first synchronization step has been performed, a second synchronization step is performed where binding data is transferred from the first synchronization device to the second synchronization device. Binding is formed in the second synchronization device between the user data unit and at least one function of the second synchronization device in accordance with the binding data.

36 Claims, 4 Drawing Sheets

DATA SYNCHRONIZATION

BACKGROUND OF THE INVENTION

The invention relates to data synchronization in a telecommunications system and particularly to synchronization of data which supplements user data.

Data of portable terminals, such as portable computers, PDA (Personal Digital Assistant) devices, mobile stations or pagers can be synchronized with databases of network applications, desktop applications or other databases of a communications system. Typically, it is data of calendar and e-mail applications that are synchronized. Synchronization has previously been based on the use of different manufacturer-specific protocols that are not compatible with each other. This restricts the use of different terminals and data types and is frequently difficult for the user. In mobile communication, in particular, it is important to acquire and update data irrespective of the terminal or application used. The SyncML (Synchronization Markup Language) has been developed based on the XML language (Extensible Markup Language) for more enhanced practical synchronization of application data. The SyncML synchronization protocol using messages in SyncML format allows data of any application to be synchronized between any networked terminals. Solutions have also been developed for synchronization of device specific data, such as mobile phone settings. An example of device management standards is the SyncML device management which is partly based on the SyncML data synchronization standard enabling data synchronization.

A situation where one user has various terminals, such as mobile phones, has become more common. These mobile stations may have very different properties: the memory capacity of one mobile station may be considerably large whereas the advantages of the other mobile station are its versatile functionality or small size. When the user changes from one mobile station to another, he would also like to transfer all the necessary personal in formation to the other mobile station. Methods have been devised for transferring user data, such as contact cards, calendar entries, SMS messages and images. SyncML synchronization or terminal-specific data transmission programs, for example, can be used for transferring user data. In addition to user data, an increasing amount of various supplementary data related to the function of the device is stored in existing terminals, such as speed dial numbers, call history, user profiles or general data related to a user data unit. It has not been possible to update data of this kind from one device to another by prior art methods because in portable devices, in particular, the data have been presented in very different manners due to their small memory capacity. Furthermore, there has not been a great need to transfer information of this kind from one device to another.

BRIEF DESCRIPTION OF THE INVENTION

An object of the invention is to provide a method and an apparatus implementing the method so as to at least partly enable synchronization of device-specific data units which supplement conventional user data units. The objects of the invention are achieved by a method, a system, a synchronization device, computer program products and a data structure which are characterized by what is disclosed in the independent claims. Preferred embodiments of the invention are disclosed in the dependent claims.

In the synchronization system of the invention binding data which associates a user data identifier identifying the user data unit with at least one function of a first synchronization device is defined. A first synchronization step where a first user data unit identified with the user data identifier is transferred from a first synchronization device to a second synchronization device is performed in the system between the first synchronization device and the second synchronization device. In response to the performance of the first synchronization step, a second synchronization step where binding data is transferred from the first synchronization device to the second synchronization device is performed between the first synchronization device and the second synchronization device. In the second synchronization device, an association is formed between the user data unit and a function of the second synchronization device in accordance with the binding data, i.e. the association formed between the first synchronization device and the user data unit is transferred to a second synchronization device. The term 'synchronization' refers to an event where data of at least one data collection is transmitted to another device, which updates another data collection using the received data, e.g. adds missing data units. In synchronization, all the data to be synchronized can be transmitted to the other party or only the modifications made to the data to be synchronized after the previous synchronization session. One-way or two-way synchronization may be used. In the latter case the first data collection is also updated on the basis of the second data collection. One-way synchronization also enables copying of the data collection into another device by the push technique or the pull technique. It should be noted that at least part of the synchronization referred to in this application can be performed by device management protocols.

An advantage of the solution according to the invention is that information describing the linkages related to the user data units and device functions can be synchronized. This facilitates the use of several terminals, such as mobile phones, since in addition to the mere user data units, various supplementary data can be transferred to terminals and the linkages need not be set manually between the user data units and device functions. In that case the user's personal environment can be transferred from one device to another, including, in addition to the user data units intended for different applications, further information on their use, such as links between user data units and applications. This way the user can easily change from one terminal to another.

The association or binding defined by the binding data from the user data unit to a device function has to be understood broadly to cover any reference to a device which has a direct or indirect relevance to the operation of the device. The binding may be formed to an application or identifier of the device, for example. The binding may also be related to the user of the device, in which case a certain image file, for example, can be associated with a certain user profile which affects the operation of the device. It should be noted that the reference is not necessarily related to one specific device but it may be a reference to all devices including a certain application or to devices of a certain version. According to a preferred embodiment, the binding data associates the user data unit with a device data unit, which is a data unit affecting the operation of the synchronization device. The device data unit typically affects the device operation as an input from a device application; for example, it may be a speed dial number available in the device or a caller group (to which an identifier, e.g. a speed dial number, can be allocated). In that case speed diallings can be synchronized after the phone numbers (user data units) defined in them have been synchronized. An association can then be formed to the second synchronization device by taking new speed diallings into use. According to another embodiment, the binding data associates the user data unit with a resource identifier which is used by at least one application. The resource identifier may be e.g. a default directory from which the application retrieves an initial image. This embodiment enables transfer of all location-specific associations from one device to another.

BRIEF DESCRIPTION OF FIGURES

The invention will now be described in greater detail by means of some embodiments with reference to the accompanying drawings, in which.

DETAILED DESCRIPTION OF THE INVENTION

In the following, an embodiment of the invention will be described in a system supporting the SyncML standard. However, it should be noted that the invention is applicable in any synchronization system, including systems utilizing the device management protocol.

Figure 1:
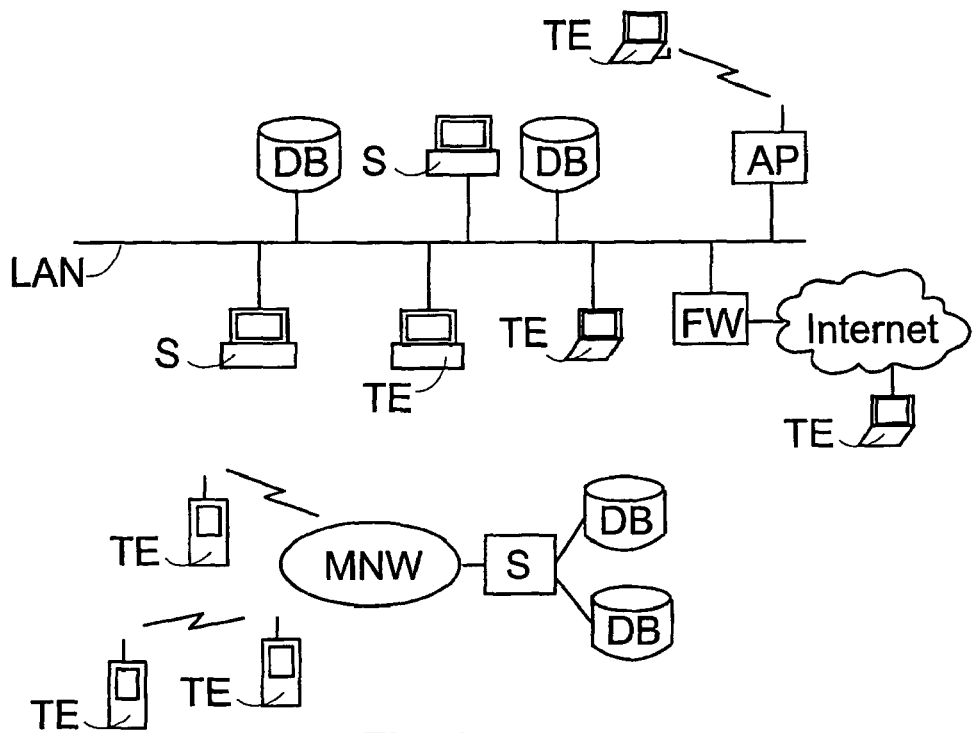
FIG. 1 illustrates a synchronization system.

FIG. 1 illustrates a networked system where database data can be synchronized between servers S and terminals TE, between terminals TE, or between servers S. The 'database to be synchronized' is to be understood broadly to refer to any memory means. If synchronization is to be performed between terminals TE or servers S, one of the terminals TE or servers S functions as a synchronization server (SyncML synchronization server defined in the SyncML standard, referred to as a synchronization server below) and the other terminals TE or servers S participating in the synchronization session function as synchronization clients (SyncML clients referred to as client device below). The server S may serve several client devices TE. The server S is typically a network server or a PC. The TE is typically a mobile phone, a PC (personal computer), a laptop computer or a PDA device.

FIG. 1 illustrates two examples, of which the first one shows client devices TE and synchronization servers S connected to a local area network LAN. The client device TE connected to the network LAN comprises functionality, e.g. a network card and software controlling data transmission, for communicating with the devices of the network LAN. The local area network LAN may be local area network of any kind, and the TE may also be connected to the server S via the Internet, typically utilizing a firewall FW. The terminal TE may also be connected to the local area network LAN wirelessly via an access point AP.

In the second example, the client device TE communicates with the server S via a mobile network MNW. The terminal TE connected to the network MNW comprises mobile station functionality for communicating with the network MNW wirelessly. There may also be other networks, such as a local area network LAN, between the mobile network MNW and the server S. The mobile network MNW may be any known wireless network, for example a network supporting the GSM service, a network supporting the GPRS service (General Packet Radio Service), a third-generation mobile network, such as a network in accordance with the 3GPP ($3^{rd}$ Generation Partnership Project) network definitions, a wireless local are network WLAN or a private network. It should be noted that the server S may in itself comprise the database it synchronizes, or the database it synchronizes may be located in another device; in FIG. 1 the servers S and the databases DB are separated for the sake of illustration. Synchronization configurations other than those exemplified in FIG. 1 are also feasible.

Figure 2A:
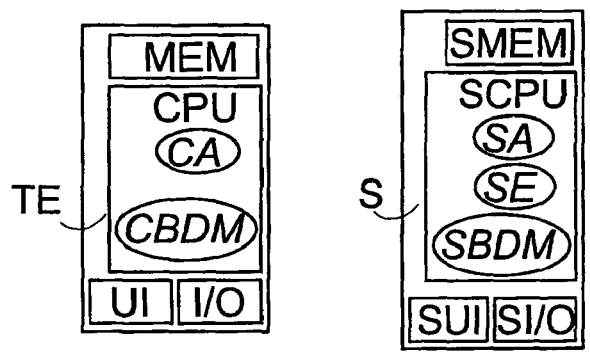
FIG. 2a is a block diagram illustrating a server functioning as a synchronization server and a terminal functioning as a client device.

As illustrated in FIG. 2a, the terminal TE and server S comprise a memory MEM; SMEM, a user interface UI; SUI, I/O means I/O; SI/O for arranging data transmission and a central processing unit CPU; SCPU comprising one or more processors. The memory MEM; SMEM contains a non-volatile part for storing applications controlling the central processing unit CPU; SCPU and other data to be stored and a volatile part for temporary data processing. The data to be synchronized is stored in the memory MEM of the TE (which in respect of synchronization is the database to be synchronized), in the memory SMEM of the servers S or in the memory of the databases DB.

The TE functioning as the client device according to the SyncML standard comprises a client agent CA, which is responsible for the functions related to the synchronization session in the client device. The device S functioning as the synchronization server comprises a sync server agent SA, which is responsible for the synchronization session, and a synchronization block SE (Sync Engine). According to a preferred embodiment of the invention, the device comprising the client agent CA also comprises means CBDM for processing binding data in the client device and the device S functioning as the synchronization server comprises means SBDM for processing binding data received from the client device.

Figure 2B:
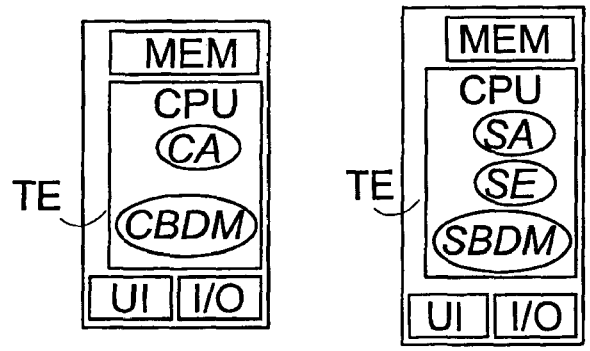
FIG. 2b is a block diagram illustrating a terminal functioning as a synchronization server and a terminal functioning as a client device.
Figure 3:
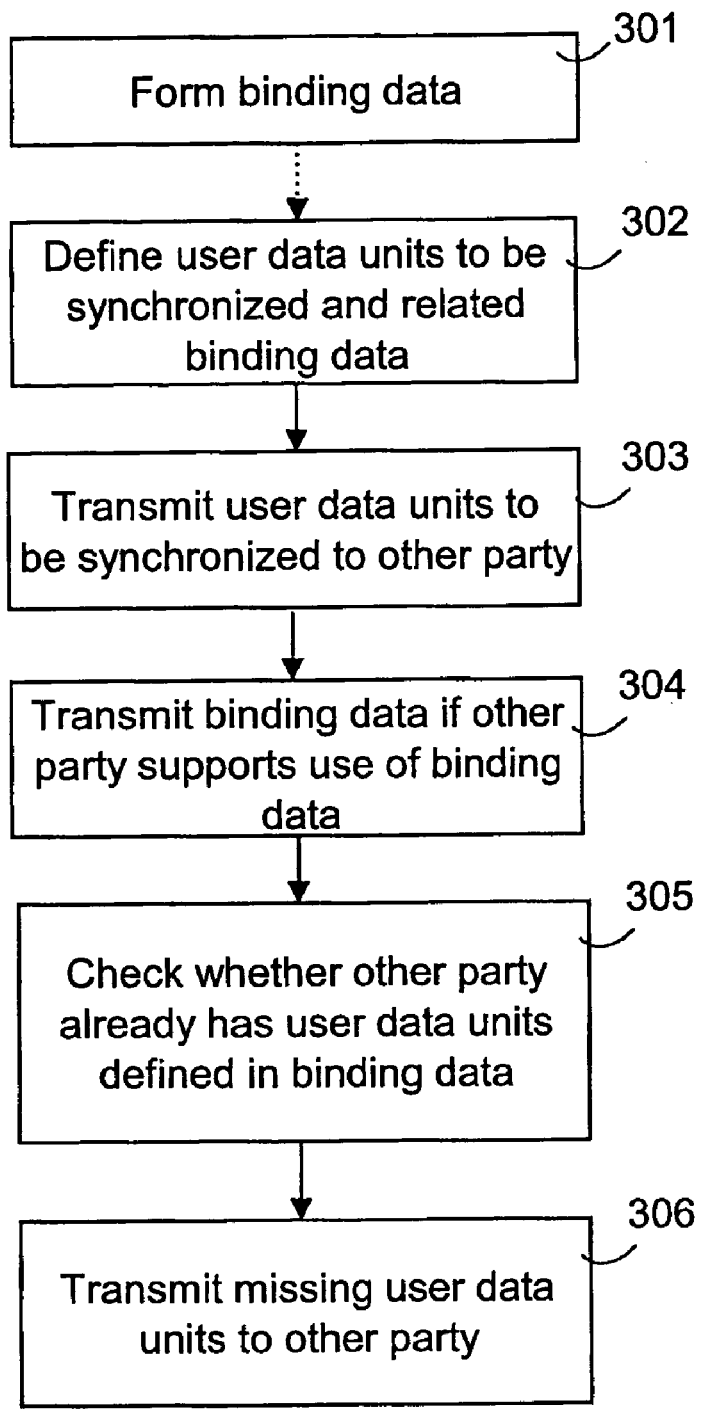
FIG. 3 is a flow chart illustrating a method according to an embodiment of the invention.
Figure 4:
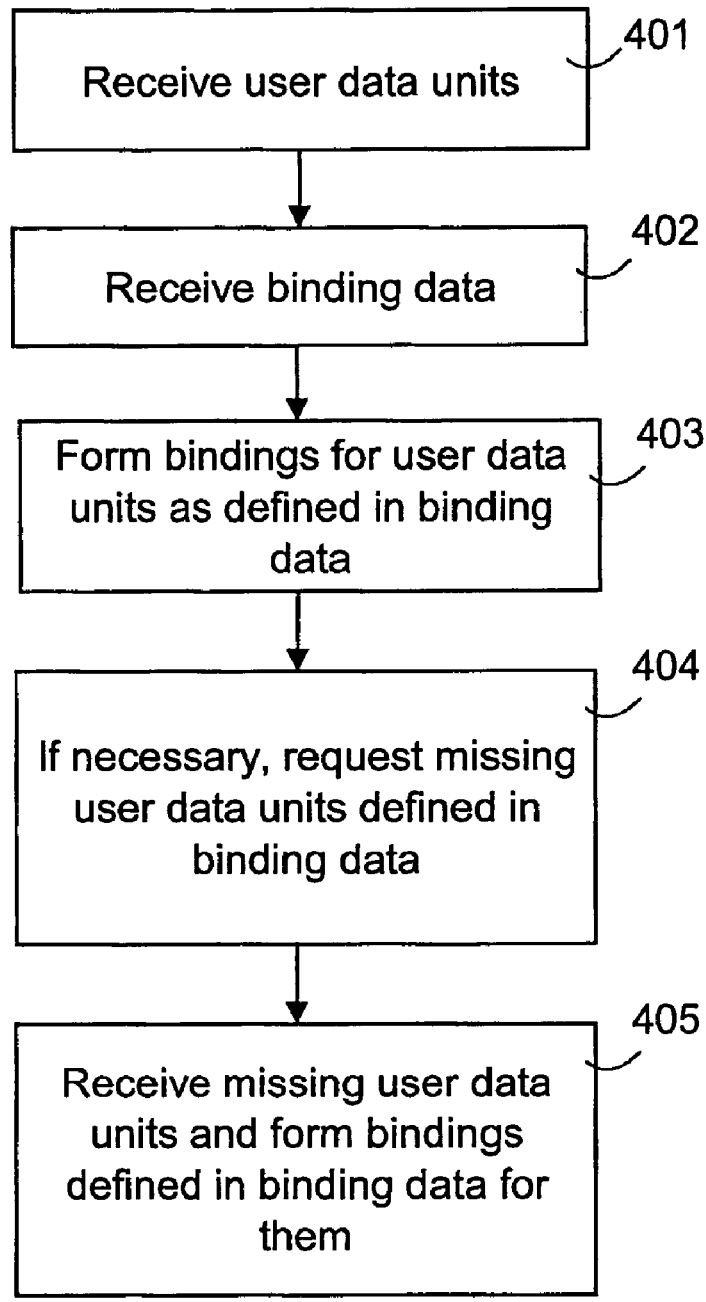
FIG. 4 is a flow chart illustrating a method according to an embodiment of the invention.

The client agent CA can be implemented by executing a computer program code stored in the memory MEM in the processing unit CPU, and the SA, SE by executing a computer program code stored in the memory SMEM in the SCPU. The means CBDM and SBDM can be implemented correspondingly in the CPU and SCPU as added to the computer program codes implementing the CA and the SA and SE, respectively. As stated above, the TE and S can function as a synchronization server and/or as a client device. As illustrated in FIG. 2b, in addition to the client functions CA, CBDM or instead of them, the terminal TE may comprise functions of the server agent SA, synchronization block SE and means SBDM for processing server binding data. In that case one of the terminals may function as a synchronization server in synchronization between the terminals. This situation is typical for the transfer of device-specific binding data when, for example, one changes to a new mobile station or uses two mobile stations. The computer program codes executed in the central processing units CPU and SCPU can thus also make the terminal TE and the synchronization server S implement inventive functions, embodiments of which are illustrated in FIGS. 3 and 4. The computer program may also be stored in any memory means, for instance on the hard disk of a PC or on a CD-ROM disk, from which it can loaded to the memory MEM; SMEM of the device TE; S executing it. The computer program can also be loaded via the network using TCP/IP protocol stacks, for example. The inventive means can also be implemented using hardware solutions or a combination of hardware and software solutions. According to an embodiment, a data structure including binding data defined in the first synchronization device is formed in the means CBDM, SBDM for processing binding data in the first synchronization device. This data structure is transferred to a second synchronization device, whose means CBDM, SBDM for processing binding data cause the second synchronization device to form binding between the user data unit received from the first synchronization device and at least one of its functions during the execution of a computer program which updates the data stored in the memory of the second synchronization device. In that case a new user profile, for example, can be transferred from one device to another. It should be noted that the device where the binding data affecting the operation of the device, e.g. a data structure including a profile, is formed and stored is not necessarily the same device where the binding data is synchronized to the second synchronization device. The processing of binding data will be described more closely in the following.

The data to be synchronized can be divided into two groups:
- user data units, e.g. e-mail messages, images, calendar entries, SMS messages or contact cards
- binding data which is related to at least one user data unit and associates it with a device (TE, S). An example of binding data which associates the user data unit and the device is data which associates the speed dial numbers available in the device with the phone numbers defined by the user. Device-specific binding data may further associate speed dial numbers with a certain mobile station according to the mobile station identifier. The association to a device may also be a more specific association to a function of the device, e.g. to a certain application. In particular, binding data affecting call or communication applications often needs to be synchronized. The binding data may be data defined generally for several applications or it may be application-specific data.

It has been possible to synchronize the binding data between user data units to at least some extent, e.g. a link from a text file to an image. One has also been able to preserve the storage structure, i.e. directory structure, of user data units when synchronizing them. This, however, requires that the directory structure (changes to it) be synchronized first, after which the user data units to be inserted into the directories can be synchronized. According to a preferred embodiment of the present invention, structured data is synchronized in a completely different manner: the necessary user data units are synchronized first and then the binding data, which associates one or more user data units that have already been synchronized with the device. The mere device-specific binding data has no significance without the data units referred to in it. For example, an empty caller group for which functionality dependent on a caller has been defined is not a group; instead, a folder where contact cards are stored may exist even if it includes no contact card. Thus the solution according to the invention enables implementation of functional synchronization of device-specific data units which supplement conventional user data units.

Synchronization of binding data in addition to the user data units also provides several advantages: for example, when the user's textual contact information (names, phone numbers, addresses, etc.) have been synchronized, binding data synchronization enables transfer of the associations from contact information to various device-specific device data units, such as speed dial numbers and caller groups. In practice, the binding data associates the user data identifier identifying the user data unit with one or more device data identifiers of the device data unit, e.g. to speed dial number identifier '5'. In that case the device to which the contact information, calendar entries and binding data have been synchronized may configure the necessary functions immediately after binding data synchronization, e.g. set the device to call number '123456' in response to the dialling of number '5'. Instead of the device data unit, the interface to a device function may also be defined by a resource identifier, for example a folder defined by a certain application, in which case the binding data includes, in addition to the user data unit, a resource identifier, such as a URI identifier (Uniform Resource Identifier).

The forming of binding data and synchronization of user data and binding data are illustrated in FIGS. 3 and 4. FIG. 3 illustrates the functionality of the device that forms binding data and transmits it to another party, and FIG. 4 illustrates the functionality of the device that receives binding data. It should be noted that the device comprising the functionality shown in FIG. 4 may be either a synchronization server or a client device. Step 301 comprises forming binding data which defines associations between the user data units of the device (TE, S). The forming 301 of binding data may take place at any time when data units are used, automatically during synchronization, or it is activated by the user. Binding data is typically formed 301 when a new data unit is added to the device. Binding data can be formed when a speed dial number is defined for contact information, for instance. In that case, one may form a new data unit to be synchronized, i.e. a binding data unit which associates a speed dial number with a phone number in the contact in formation. The binding data unit includes at least one user data identifier of the user data unit and a device data identifier of the device data unit of the device (TE, S). The device data identifier may be any identifier of the device data unit related to a function of the device. According to an embodiment, the binding data may be associated with the device identifier or the identifier of the device user, e.g. with an international mobile equipment identifier IMEI. The binding data unit may also include references to these identifiers so that binding can be formed between the user data unit and the device. The binding data unit may also include a link, such as a URI identifier (Uniform Resource Identifier). The binding data unit may simply be a record including the LUID identifiers of two data units, for instance. The binding data unit may also directly refer to the application to which the user data unit is to be associated, for example to an application file. The binding data unit may also include information other than the identifiers required by the actual binding. For example, it may define the caller group identifier with which contacts included in the binding data unit or referred to in it are associated.

When user data needs to be synchronized, the user data units to be synchronized and the related binding data are defined 302. The user data units to be synchronized may be defined in the device settings; for example, the device may comprise a setting according to which all e-mail messages are synchronized when the e-mail application is shut down. The user may also define the user data units to be synchronized at the beginning of synchronization. All binding data units related to the selected user data units are typically defined as units to be synchronized in step 302 but the user may also restrict the selection of binding data units.

In step 303 user data units are transmitted to the other party, and thus one-way or two-way synchronization can be performed on the user data units. After the user data units have been transmitted, the binding data can be transmitted 304 for synchronization. If one-way synchronization was performed on the user data, binding data will also be synchronized using one-way synchronization. According to a preferred embodiment, it is checked whether the receiving device supports binding data synchronization. The check may be based on information indicated in the exchanged device capabilities during the initialization of the synchronization session or on a separate inquiry, for instance. If the receiving device supports synchronization of the binding data related to the synchronized user data, the binding data can be transmitted in step 304.

In FIG. 4 the device that received the user data units (a synchronization server or a device to which it transmits the received user data units) receives and stores 401 the user data units it does not already have. After this, the binding data is received 402. Binding is formed 403 between the user data units and the terminal according to the received binding data units. The binding data provides the necessary identifiers of the user data units and device data units to be associated (user data identifiers and device data identifiers or references to them), by means of which the receiving device can form the binding. After this, the user data units defined in the binding data are associated with one or more device data units. These associations can be utilized in various ways in the operation of the receiving device: when an application searches for a certain user data unit, data associated with the user data unit are also automatically retrieved for the application. This may also be performed vice versa in the device: when the user selects a certain function when activating a speed dial number, for instance, a call is established to the number associated with the device data unit on the basis of the binding data, i.e. to the speed dial number. The binding data according to the binding data unit, i.e. user data units and device data units, or at least some of them can be retrieved when the application is activated, for example.

According to an embodiment, the device receiving the binding data requests 404 the user data units defined in the binding data if these do not already exist in the memory of the device. In FIG. 3, the transmitting device may check 305 whether all the user data units defined in the binding data have been transmitted. This check 305 may be carried out on the basis of a request received from the receiving device, for example. If user data units are missing, they are transmitted in step 306. The device that receives the binding data receives 405 the missing data units, stores them and forms associations to them according to the received binding data. In steps 404, 405, 305 and 306 it is also possible to process missing device data units instead of the user data units.

According to an embodiment which differs from the one shown in FIG. 3, binding data is not formed (301) until it has been determined which user data units are to be synchronized. The binding data can be transmitted (304) simultaneously with the user data units, e.g. using the same synchronization message, even if the user data units are stored before the binding data can be used. Another alternative is to define (302) and transmit (304) the binding data after the user data units have been transmitted (303), preferably using the same synchronization session. In an embodiment, the two-way synchronization is used between the client device and the synchronization server, in which case the client device performs at least steps 301, 302, 303, 304 and steps 401, 402 and 403 of FIG. 4 when it receives data from the synchronization server. Correspondingly, the synchronization server performs steps 401, 402, 403 and, when transmitting its modifications to the client device, steps 303 and 304 of FIG. 3.

Figure 5:
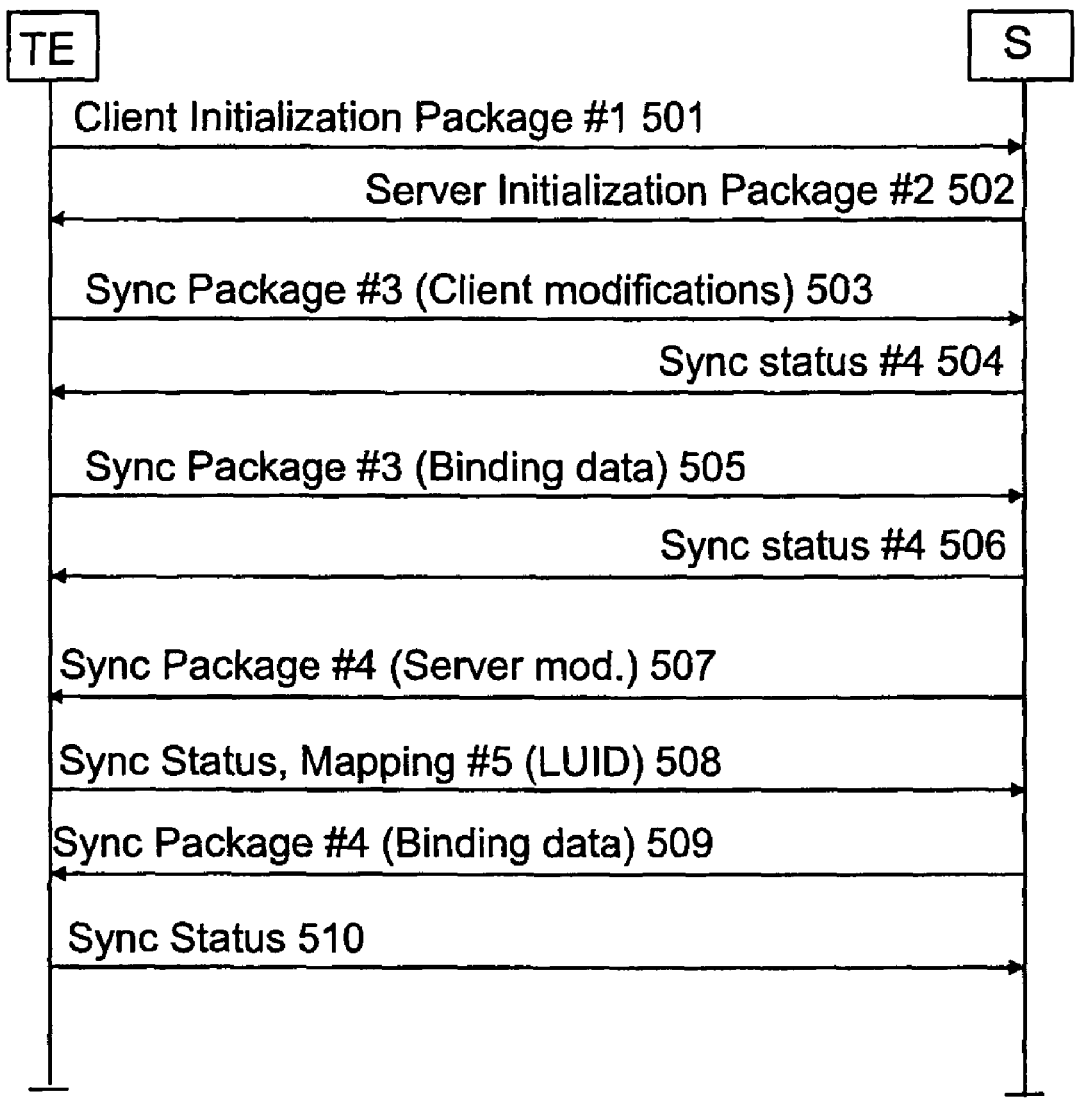
FIG. 5 is a signalling chart illustrating data synchronization in a SyncML system.

FIG. 5 is a signalling chart which exemplifies synchronization of user data units and binding data in a SyncML system. According to the SyncML standard, a synchronization session is initialized first, during which the database to be synchronized is selected. In that case a client initialization package #1 501 is transmitted from the client device (TE in FIG. 5) to the server (S in FIG. 5) and a server initialization package #2 502 to the client device. During the initialization, one may perform authentication between the client device and the server, determine the databases to be synchronized and exchange the service and device features which affect synchronization.

After the synchronization session has been initialized, the client device can transmit a SyncML package 503 (Sync Package #3 (Client modifications)) to the SyncML server. The package contains at least information on the modifications and additions made to the selection data set including user data units and/or device data units in the client device after the previous message, e.g. an e-mail message added to the set. It should be noted that in SyncML synchronization, depending on the selected synchronization type, all data to be synchronized or only the modifications made to the data to be synchronized after the previous synchronization session can be transmitted to the other party. The SyncML server synchronizes the data, i.e. analyzes the modifications made to the selection data set and harmonizes (makes necessary additions, replacements and deletions) the user data units and/or the device data units.

After this, the SyncML server S sends a server acknowledgement message 504 (Sync status #4) to the client device. It should be noted that the user data units and the device data units can be synchronized in the same message or in different messages.

According to a preferred embodiment, a second synchronization step is performed using the synchronization session formed, i.e. the binding data which associates user data units and device data units is synchronized. In that case the client device TE transmits a SyncML package 505 (Sync Package #3 (Binding data)) which includes information on the modifications made to the binding data after the previous session. Message 505 may include information on added caller groups, for instance. The SyncML server S synchronizes the data, i.e. analyzes the modifications made to the binding data and harmonizes the binding data between the client device TE and another database (server S or another device). The SyncML server S transmits a server acknowledgement message 506 (Sync status #4) to the client device. It should be noted that several messages 503;504 and 505;506 can be transmitted and binding data and user data units and/or device data units can also be transmitted in the same package.

After all the data units of the client device TE have been transferred, the SyncML server S transmits a synchronization message 507 (Sync Package #4 (Server mod.)), which also includes a synchronization command with information on the modifications made to the user data units after the previous synchronization session. The TE makes the necessary modifications and transmits status and mapping data to the SyncML server S, i.e. locally unique LUID identifiers 508 (Sync Status, mapping #5 (LUID)) it has allocated to new user data units and/or device data units. If necessary, the SyncML server updates the mapping table of the user data units and/or device data units according to message 508. The SyncML server S transmits a server synchronization package 509 (Sync Package #4 (Binding Data)) on the modifications made to the binding data after the previous synchronization of the binding data. Since the SyncML server maintains a mapping table (or tables) for user data units and between the LUID and GUID identifiers of the device data units, binding data is synchronized 505 according to a preferred embodiment by informing the SyncML server of the LUID identifiers of the associated user and device data units. According to a preferred embodiment, the SyncML server maintains a binding data table which includes the LUID identifiers of associated user and device data units. Alternatively, the binding data table may also present associations using the GUID identifiers of the user and device data units. As in the case of user data units, the client terminal TE may identify user data units in binding data (for which linkages are defined) with LUID identifiers. The TE makes the necessary modifications to the binding data and responds with a status message 510 (Sync Status).

In the example of FIG. 5, the first and the second synchronization step overlap, in which case synchronization is arranged efficiently using one SyncML session. The above example is simple; yet it illustrates how user data units and binding data which associates user data units with the device can be synchronized according to the SyncML protocol. Messages already defined in the SyncML standard can be utilized in the binding data synchronization. As regards further details of the SyncML protocol, reference is made to the SyncML specification by the SyncML Initiative Group *SyncML Sync Protocol, version* 1.1, 62 pages, 15 Feb. 2002.

As already stated, the binding data may also comprise new data units, e.g. the identifier of a caller group, which is added to a correspondence table and another database to be synchronized. In that case the server may thus also transmit new binding data to the client device. After this, binding can be formed in the client device TE and/or in the server S (or in another device to which S synchronizes binding data).

It should be noted that one-way synchronization may often be used, in which case binding data can be copied from one device into an other when one buys a new mobile phone, for example. In that case binding data is not transferred to the client device TE in message 508 but only information on the synchronization status.

The SyncML session may be implemented, for example, on top of the HTTP protocol (Hyper Text Transfer Protocol), the WSP protocol (Wireless Session Protocol) of the WAP standard (Wireless Application Protocol), the OBEX protocol used for cable links, such as the USB (Universal Serial Bus) or RS-232, or for short-range radio frequency links (Bluetooth) or infrared connections (IrDA), on top of a TCP/IP stack (Transport Control Protocol/Internet Protocol) or on top of an e-mail protocol (SMTP, Simple Mail Transfer Protocol).

In the following, we describe several examples of situations where binding data is synchronized. One situation where binding data can be synchronized is synchronization of speed dial numbers. Binding data which associates a speed dial number with a phone number or with other contact information (e.g. an e-mail address) can be synchronized as described above after the contact information stored in the mobile phone or in the subscriber's identification unit has been synchronized. The speed dial numbers and numbers associated with them or a reference to them can be transferred (304, 402) in a synchronization message formed for this purpose. The fact that the device supports the synchronization of speed dial numbers is preferably indicated in the device capabilities exchanged during the initialization of a synchronization session. A synchronization message from the client device to the synchronization server preferably includes a speed dial number and the local identifier LUID of the contact related to it.

The synchronization server may check whether the speed dial number is already reserved for some contact. If it is not, the speed dial number can be updated for the device which receives binding data and forms (403) binding between the speed dial number and the contact. If the speed dial number is reserved, the received speed dial number is preferably rejected and the stored speed dial number remains in force. The server preferably also checks whether the contact (e.g. a phone number) associated with to the speed dial number is the same as the contact associated with the received speed dial number. If they correspond to each other, the synchronization server does not need to transmit the speed dial number stored in the client device. Speed dial numbers are typically user-specific and they can be associated with a subscriber identity unit, such as a SIM or USIM identification unit, for example. In that case, device-specific or network-specific binding data may also be related to the speed dial numbers. This data can be synchronized to another device after the synchronization of speed dial numbers, for instance.

Another example of a situation where binding data can be utilized is transfer of caller groups from one device to another. Before synchronization of caller groups, at least the contact information defined by them must be synchronized. The fact that the device supports the synchronization of caller groups and the content types related to them, e.g. sound types supporting the ringing tones to be associated with the caller group, is preferably indicated in the device capabilities exchanged the initialization of a synchronization session. When binding data of a caller group is synchronized, information on the group is preferably transmitted first, i.e. a caller group identified with a number is created. The group can be defined in the target and source elements of an Add command, for example. Contacts belonging to the caller group identified with a caller group identifier are determined in a synchronization message preferably using LUID identifiers. The example below illustrates an item of a synchronization message for binding data of the caller group where 5 is the LUID identifier of the caller group and 11 is the LUID identifier of a caller group member (refers e.g. to one user data unit of the contact database).

```
<Add>
    ...
    <Item>
        <Source>
            <LocURI>./5/11</LocURI>
        </Source>
    ...
</Add>
```

In addition to the members, the name of the caller group, caller group specific ringing tones, pictures or various additional definitions can be defined in the caller group binding data. Using the correspondence table of the binding data and the identifiers, the synchronization server may transmit caller group information to the receiving device or to a database, where an association is formed between the contact information of the caller group (5) and the member (11) added to it. When the synchronization server receives caller group binding data from the client device, it checks whether a caller group already exists. If a caller group already exists for the same identifier, the groups are combined, i.e. the original members and new members are defined for the caller group. The caller group may also be defined as a default caller group, in which case it replaces previous caller groups or previous caller groups are added to the default caller group. If there is no caller group, the synchronization server creates a new group. On the basis of the binding data related to the caller group, the terminal can be arranged (step 403) to use binding as follows, for example: When a mobile station receives an incoming call, the caller's number is checked and it is detected that a caller group identifier is associated with the number. Furthermore, a certain ringing tone, for example, may be associated with a caller group according to the caller group identifier, and this tone is selected as the ringing tone for an incoming call by the call management application of the mobile station. A received message can be directed to a certain directory, for example, on the basis of a setting related to the caller group.

According to a further example, the binding data is also related to the user in such a manner that it associates at least one user data unit with the user profile, e.g. to a file which defines the user's settings. After the user profile file, user data unit and binding data have been transferred to the receiving device, the receiving device can automatically retrieve the associated user data unit, too, in connection with the user profile selection.

Any resource identifier associated with a user data unit, e.g. to a calendar entry, e-mail message or contact information, in other words a link to a location which affects the operation of the device, may be defined in the binding data. This kind of binding data synchronization must also be preceded by synchronization of the user data unit indicated so that the resource identifier can be associated with the user data unit. Instead of the device data unit, the link may also indicate a directory. It should be noted that files or directories which are referred to in the binding data and to which binding is formed from the user data unit, may be defined in the operating system of the device (TE, S) or defined internally by the application to be executed on top of it. In the case of links, the operation may correspond to the one described above: the LUID or GUID identifier allocated to the link is associated with the LUID or GUID identifier of the user data unit in the binding data. How the LUID and GUID identifiers are associated with the resource referred to by the identifier in the database (MEM, SMEM) concerned is an implementation specific feature independent of the invention. The formation of binding between the user data unit and a device function requires that the functions of the synchronization devices correspond to one another in respect of the data unit or directory defined in the binding data.

In a very simple example, the resource identifier is set in the call management application to a certain directory '/Ringing Tones/Default Ringing Tone/', from which the default ringing tone is always retrieved. When the user's ringing tones are synchronized e.g. to the directory '/Ringing Tones/', the binding data where a ringing tone is associated with the directory '/Ringing Tones/Default Ringing Tone/' is synchronized. On the basis of this binding, binding can be formed in the device that receives the binding data, i.e. the ringing tone file or a link to it can be stored in the directory '/Ringing Tones/Default Ringing Tone/'. Since the application retrieves the ringing tone from the directory '/Ringing Tones/Default Ringing Tone/', the correct ringing tone is, thanks to the binding data synchronization, set as the default ringing tone and the user does not need to set it manually. According to another example, the user may associate an image file with an application, in which case the image file is always retrieved when the application is activated.

The binding data to be transferred may be user-specific or terminal-specific data. The user may, for example, transfer the binding of the settings of his terminal TE to a new terminal. The binding data unit that associates one or more settings with a user data unit may define the terminal type or the user profile to which the user data unit is related, for instance. Other feasible settings for which binding is defined include profiles, user interface settings, training records used in speech recognition or word recognition, call diversions and security settings. For example, when the terminal to be used is changed, a setting is transferred to the new terminal according to which a certain personal image (user data unit) is used in the terminal as the background image (image is inserted into user interface settings). The binding data may also associate various kinds of history data with the user data unit, such as various logs, e.g. a call register, an error log or game results. Binding data units of this kind may also be related to a user data unit synchronized earlier; for example, the call register refers to the phone numbers of contacts. It should be noted that binding can be formed from a user data unit to a device by storing a user data unit in a certain location, i.e. in a certain memory location. In that case the binding data includes an explicit or an implicit reference to the identifier of this memory location.

Synchronization between two devices was illustrated above. Binding data synchronization can, however, be also implemented between more than two devices. The client devices may function as described above and form binding in accordance with the binding data. The user having several terminals in use can distribute the necessary binding data to all the terminals. For example, caller group binding data is synchronized to all the devices indicated in the phone numbers defined in a caller group.

It is obvious to a person skilled in the art that as the technology advances, the inventive concept can be implemented in various ways. Binding data related to any user data can be synchronized applying the examples described above. The invention and its embodiments are thus not limited to the above examples but may vary within the scope of the claims.

The invention claimed is:

1. A method comprising:
defining binding data which associates a user data identifier identifying a user data unit with an identifier for identifying at least one function of a first communications device;
performing a first synchronization step between the first communications device and a second communications device, the step comprising transferring the user data unit from the first communications device to the second communications device;
performing a second synchronization step between the first communications device and the second communications device in response to the performance of the first synchronization step, the second step comprising transferring the binding data from the first communications device to the second communications device, wherein the second communications device is a mobile communications device or a synchronization server configured to synchronize the binding data to a mobile communications device to form binding in the mobile communications device in accordance with the binding data, and the first communications device checks whether the second communications device supports binding data synchronization and transmits the binding data to the second communications device in the second synchronization step in response to the fact that the second communications device supports binding data synchronization on the basis of the check.

2. The method of claim 1, wherein the first communications device checks if the second communications device has user data units defined in the binding data, and
the first communications device transmits any missing user data units to the second communications device.

3. A method according to claim 1, wherein the binding data associates the user data unit with a resource identifier which is used by at least one application.

4. A method according to claim 1, wherein the binding data associates the user data unit with a device data unit which is a data unit affecting the operation of the second communications device.

5. A method according to claim 4, wherein the user data unit is a phone number or refers to a phone number and the binding data associates the user data unit with a device data unit which is a speed dial number.

6. A method according to claim 4, wherein the user data unit is a phone number or refers to a phone number and the binding data associates the user data unit with a device data unit, which is the identifier of a caller group.

7. A method according to claim 4, the method further comprising:
synchronizing the device data unit from the first communications device to the second communications device in connection with the synchronization of the user data unit.

8. A method according to claim 1, wherein the first communications device is configured to function as a server in accordance with a synchronization markup language protocol and the second communications device is configured to function as a client in accordance with a synchronization markup language protocol.

9. A communications device comprising means for establishing a synchronization session for user data synchronization with a second communications device, wherein the communications device is configured to define binding data which associates a user data identifier identifying a user data unit with an identifier for identifying at least one function of the mobile communications device;
the communications device is configured to perform a first synchronization step with the second communications device, the step comprising transferring the user data unit from the communications device to the second communications device; and
the communications device is configured, in response to the performance of the first synchronization step, to perform a second synchronization step with the second communications device, the second step comprising transferring the binding data from the communications device to the second communications device, wherein the second communications device is a mobile communications device or a synchronization server configured to synchronize the binding data to a mobile communications device to form binding in the mobile communications device in accordance with the binding data and the communications device is configured to check whether the second communications device supports binding data synchronization and to transmit the binding data to the second communications device in the second synchronization step in response to the fact that the second communications device supports binding data synchronization on the basis of the check.

10. A mobile communications device comprising means for establishing a synchronization session for user data synchronization with a second communications device, wherein the mobile communications device is configured to perform a first synchronization step with the second communications device, the step comprising receiving a user data unit from the second communications device;
the mobile communications device is configured, in response to the performance of the first synchronization step, to perform a second synchronization step with the second communications device, the second step comprising receiving binding data which associates a user data identifier identifying the user data unit with an identifier for identifying at least one function of the second communications device;
the mobile communications device is configured to form binding between the received user data unit and at least one function of the mobile communications device in accordance with the binding data received during the second synchronization step;
the mobile communications device is configured to check if all user data units defined in the received binding data are available in the mobile communications device;
in response to at least one user data unit defined in the received binding data not being available in the mobile communications device on the basis of the check, the mobile communications device is configured to request the at least one further user data unit from the second communications device;
and
the mobile communications device is configured to form a binding between the at least one further user data unit, received in response to the request, and at least one of its functions in accordance with the binding data.

11. A non-transitory computer readable storage medium encoded with a computer program, the computer readable medium comprising:
a program code portion for controlling a communications device to define binding data which associates a user data identifier identifying a user data unit with an identifier for identifying at least one function of the communications device;
a program code portion for controlling the communications device to perform a first synchronization step with a second communications device, the step comprising transferring the user data unit from the communications device to the second communications device; and
a program code portion for controlling the communications device to perform, in response to the performance of the first synchronization step, a second synchronization step with the second communications device, the second step comprising transferring the binding data from the communications device to the second communications device, wherein the second communications device is a mobile communications device or a synchronization server configured to synchronize the binding data to a mobile communications device to form binding between the received user data unit and at least one function of the mobile communications device, and the computer readable medium comprises a program code portion for checking whether the second communications device supports binding data synchronization and a program code portion for transmitting the binding data to the second communications device in the second synchronization step in response to the fact that the second communications device supports binding data synchronization on the basis of the check.

12. A non-transitory computer readable storage medium encoded with a computer program, the computer readable medium comprising:
a program code portion for controlling a mobile communications device to perform a first synchronization step with a second communications device, the step comprising receiving a user data unit;
a program code portion for controlling the mobile communications device to perform, in response to the performance of the first synchronization step, a second synchronization step with the second communications device, the second step comprising receiving, from the second communications device, binding data which associates a user data identifier identifying the user data unit with an identifier for identifying at least one function of the second communications device; and a program code portion for controlling the mobile communications device to form binding between the received user data unit and one function of the mobile communications device in accordance with the binding data received during the second synchronization step;

a program code portion for controlling the mobile communications device to check if all user data units defined in the received binding data are available in the mobile communications device;

a program code portion for controlling the mobile communications device to, in response to at least one user data unit defined in the received binding data not being available in the mobile communications device on the basis of the check, request the at least one further user data unit from the second communications device; and a program code portion for controlling the mobile communications device to form a binding between the at least one further user data unit, received in response to the request, and at least one of its functions in accordance with the binding data.

13. A non-transitory computer readable storage medium storing a data structure for use in a mobile communications device, wherein the data structure comprises binding data associating a user data identifier identifying a user data unit with an identifier for identifying at least one function of the mobile communications device and which is defined in a second communications device and which during the execution of a computer program which updates the data stored in the memory of the mobile communications device causes the mobile communications device to form binding between a user data unit received from the second communications device and at least one function of the mobile communications device, the data structure being configured to be receivable during a second synchronization step between the mobile communications device and the second communications device, the second step comprising receiving the binding data from the second communications device to the mobile communications device in response to the performance of a first synchronization step comprising receiving the user data unit from the second communications device to the mobile communications device, which is further configured to check if all user data units defined in the binding data are available in the mobile communications device, in response to at least one user data unit defined in the received binding data not being available in the mobile communications device on the basis of the check, request the at least one further user data unit from the second communications device, and form a binding between the at least one further user data unit and at least one of its functions in accordance with the binding data.

14. A computer readable storage medium according to claim 13, wherein the binding data associates the user data unit with a device data unit which is a data unit affecting the operation of the mobile communications device.

15. An apparatus comprising
memory storing computer program code, and
at least one processor, the memory and the computer program code being configured to, with the at least one processor, cause the apparatus to perform at least the following:
define binding data which associates a user data identifier identifying the user data unit with an identifier for identifying at least one function of the apparatus;
perform a first synchronization step with a communications device, the step comprising transferring the user data unit from the apparatus to the communications device; and
in response to the performance of the first synchronization step, perform a second synchronization step with the communications device, the second step comprising transferring the binding data from the apparatus to the communications device, the apparatus being configured to check whether the communications device supports binding data synchronization and transmit the binding data to the communications device in the second synchronization step in response to the fact that the communications device supports binding data synchronization,
wherein the communications device is a mobile communications device or a synchronization server configured to synchronize the binding data to a mobile communications device to form binding in the mobile communications device in accordance with the binding data.

16. An apparatus according to claim 15, wherein the binding data associates the user data unit with a device data unit which is a data unit affecting the operation of the communications device.

17. An apparatus according to claim 15, wherein the user data unit is a phone number or refers to a phone number and the binding data associates the user data unit with a device data unit which is a speed dial number.

18. An apparatus according to claim 15, wherein the user data unit is a phone number or refers to a phone number and the binding data associates the user data unit with a device data unit, which is the identifier of a caller group.

19. An apparatus according to claim 16, wherein the apparatus is configured to function as a server in accordance with a synchronization markup language protocol.

20. An apparatus according to claim 15, wherein the binding data associates the user data unit with a resource identifier which is used by at least one application.

21. An apparatus according to claim 15, wherein the memory and the computer program code are configured to, with the at least one processor, cause the apparatus to further:
check if the user data units defined in the binding data have been transmitted to the communications device, and
transmit any missing user data units to the communications device.

22. An apparatus according to claim 15, wherein the memory and the computer program code are configured to, with the at least one processor, cause the apparatus to synchronize binding data formed by another device.

23. An apparatus comprising
memory storing computer program code, and
at least one processor,
the memory and the computer program code being configured to, with the at least one processor, cause the apparatus to perform at least the following:
a mobile communications device to perform a first synchronization step with a second communications device, the step comprising receiving a user data unit from the second communications device;
in response to the performance of the first synchronization step, perform a second synchronization step with the second communications device, the step comprising receiving binding data which associates a user data identifier identifying the user data unit with an identifier for identifying at least one function of a communications device;

form binding, at the mobile communications device, between the received user data unit and at least one function of the mobile communications device in accordance with the binding data received during the second synchronization step;

check if all user data units defined in the received binding data are available in the mobile communications device;

in response to at least one user data unit defined in the received binding data not being available in the mobile communications device on the basis of the check, request the at least one further user data unit from the second communications device;

and form a binding between the at least one further user data unit, received in response to the request, and at least one of functions of the mobile communications device in accordance with the binding data.

24. An apparatus according to claim 23, wherein the binding data associates the user data unit with a device data unit which is a data unit affecting the operation of the mobile communications device.

25. An apparatus according to claim 23, wherein the user data unit is a phone number or refers to a phone number and the binding data associates the user data unit with a device data unit which is a speed dial number.

26. An apparatus according to claim 23, wherein the user data unit is a phone number or refers to a phone number and the binding data associates the user data unit with a device data unit, which is the identifier of a caller group.

27. An apparatus according to claim 23, wherein the binding data associates the user data unit with a resource identifier which is used by at least one application.

28. An apparatus according to claim 23, wherein the memory and the computer program code are configured to, with the at least one processor, cause the apparatus to further:

function as a client in accordance with a synchronization markup language protocol; and maintain a binding data table which associates a local unique identifier or global unique identifier of the user data unit with at least one local unique identifier or global unique identifier related to the apparatus.

29. An apparatus according to claim 23, wherein the apparatus is a mobile terminal.

30. A method comprising:

receiving, by a mobile communications device, a user data unit from a second communications device in a first synchronization step with the second communications device;

in response to the performance of the first synchronization step, receiving, from the second communications device, binding data which associates a user data identifier identifying the user data unit with an identifier for identifying at least one function of a mobile communications device in a second synchronization step with the mobile communications device; and forming binding between the user data unit and at least one function of the mobile communications device in accordance with the binding data received during the second synchronization step;

checking if all user data units defined in the received binding data are available in the mobile communications device;

in response to at least one user data unit defined in the received binding data not being available in the mobile communications device on the basis of the check, requesting the at least one further user data unit from the second mobile communications device;

and forming binding between the at least one further user data unit, received in response to the request, and at least one of functions of the second mobile communications device in accordance with the binding data.

31. The method according to claim 30, wherein the binding data associates the user data unit with a device data unit which is a data unit affecting the operation of the mobile communications device.

32. The method according to claim 30, wherein the user data unit is a phone number or refers to a phone number and the binding data associates the user data unit with a device data unit which is a speed dial number.

33. The method according to claim 30, wherein the user data unit is a phone number or refers to a phone number and the binding data associates the user data unit with a device data unit, which is the identifier of a caller group.

34. The method according to claim 30, wherein the binding data associates the user data unit with a resource identifier which is used by at least one application.

35. The method according to claim 30, wherein the mobile communications device is a client operating in accordance with a synchronization markup language protocol; and the mobile communications device maintains a binding data table which associates a local unique identifier or global unique identifier of the user data unit with at least one local unique identifier or global unique identifier related to a communications device.

36. The method according to claim 30, wherein the second communications device is a mobile terminal.

* * * * *